US012655924B2

(12) United States Patent
Lu et al.

(10) Patent No.: US 12,655,924 B2
(45) Date of Patent: Jun. 16, 2026

(54) JOINT APPARATUS AND VEHICLE

(71) Applicant: Langfang Shuchang Auto Parts CO., Ltd, Hebei (CN)

(72) Inventors: Qingshan Lu, Hebei (CN); Jiaqi Liu, Hebei (CN); Xingyu Lu, Hebei (CN); Renjie Wei, Hebei (CN)

(73) Assignee: Langfang Shuchang Auto Parts Co., Ltd., Hebei (CN)

( * ) Notice: Subject to any disclaimer, the term of this patent is extended or adjusted under 35 U.S.C. 154(b) by 36 days.

(21) Appl. No.: 18/818,888

(22) Filed: Aug. 29, 2024

(65) Prior Publication Data

US 2025/0368154 A1 Dec. 4, 2025

(30) Foreign Application Priority Data

May 28, 2024 (CN) .......................... 202410675872.1

(51) Int. Cl.
F16L 37/098 (2006.01)

(52) U.S. Cl.
CPC ....... F16L 37/0985 (2013.01); F16L 2201/10 (2013.01)

(58) Field of Classification Search
CPC .......................... F16L 37/0985; F16L 2201/10
See application file for complete search history.

(56) References Cited

U.S. PATENT DOCUMENTS

| | | | | |
|---|---|---|---|---|
| 5,882,047 | A * | 3/1999 | Ostrander | ........... F16L 37/0985 |
| 2007/0222216 | A1* | 9/2007 | Bauer | ................. F16L 37/0985 |
| 2008/0012314 | A1 | 1/2008 | Harger et al. | |
| 2023/0381804 | A1* | 11/2023 | Stadtler | ............... F16L 37/0985 |
| 2025/0226483 | A1* | 7/2025 | Zhao | ................... F16L 37/0985 |

FOREIGN PATENT DOCUMENTS

| | | |
|---|---|---|
| CN | 113404957 A | 9/2021 |
| CN | 218378239 U | 1/2023 |
| CN | 115930017 A | 4/2023 |
| CN | 218845408 U | 4/2023 |
| EP | 0360634 A1 | 3/1990 |

OTHER PUBLICATIONS

Partial-European Search Report for European Application No. 24196185.3; dated May 21, 2025; 13 pages.
Partial European Search Report for European Application No. 24196185.3; dated Jan. 28, 2025; 13 pages.

* cited by examiner

*Primary Examiner* — Zachary T Dragicevich
(74) *Attorney, Agent, or Firm* — Quarles & Brady LLP

(57) ABSTRACT

A joint apparatus and a vehicle, where the joint apparatus includes a first joint, a second joint and a limiting assembly, where the first joint includes a first extension portion and a second extension portion, which are provided in a first direction, and an end of the second joint is provided with a socket. When the first joint and the second joint are in a mounted state, the first extension portion is inserted into the socket in the first direction, and the limiting assembly is configured to limit the first joint and the second joint from moving away from each other in the first direction.

18 Claims, 9 Drawing Sheets

JOINT APPARATUS AND VEHICLE

CROSS-REFERENCE TO RELATED APPLICATIONS

The present application claims priority to Chinese Patent Application No. 202410675872.1, filed on May 28, 2024, which is hereby incorporated by reference in its entirety.

TECHNICAL FIELD

The present application relates to the technical field of vehicles and, in particular, to a joint apparatus and a vehicle.

BACKGROUND

In systems of a vehicle such as a fuel system and a cooling system, it is necessary to provide corresponding pipelines, and these pipelines are connected to a cylinder body or a pump body in the systems through a joint apparatus, so as to serve as delivery channels for a fluid media such as fuel and coolant.

In the relevant art, the joint apparatus may include a male joint and a female joint. One end of the female joint is pre-mounted to the cylinder body or the pump body in the systems, and the other end of the female joint is provided with a socket, one end of the male joint is inserted into the socket, and the other end of the male joint is connected to the pipelines, so that the pipelines are connected to the cylinder body or the pump body in the systems through the joint apparatus.

However, the connection between the above-mentioned male joint and female joint mentioned is less stable.

SUMMARY

In view of at least one of the above-mentioned technical problems, embodiments of the present application provide a joint apparatus and a vehicle, which can improve the connection stability between a first joint and a second joint.

The embodiments of the present application provide the technical solutions as follows.

A first aspect of an embodiment of the present application provides a joint apparatus, including a first joint, a second joint and a limiting assembly, where the first joint includes a first extension portion and a second extension portion, which are provided in a first direction, and an end of the second joint is provided with a socket. When the first joint and the second joint are in a mounted state, the first extension portion is inserted into the socket in the first direction, and the limiting assembly is configured to limit the first joint and the second joint from moving away from each other in the first direction.

The joint apparatus provided in the embodiment of the present application may include the first joint, the second joint and the limiting assembly, where the first joint includes the first extension portion and the second extension portion that are provided in the first direction and an end of the second joint is provided with the socket, and when the first joint and the second joint are in the mounted state, the first extension portion is inserted into the socket in the first direction, and the limiting assembly is configured to limit the first joint and the second joint from moving away from each other in the first direction. In this way, it is possible to prevent by the limiting assembly the first joint and the second joint from moving away from each other in the first direction so as to ensure a stable connection between the first joint and the second joint, thereby improving connection stability between the first joint and the second joint.

In a possible embodiment, the limiting assembly includes a first limiting member and a second limiting member, where the first limiting member is located on an outer wall of the first joint and extends in the first direction, one end of the first limiting member is provided close to the second extension portion and is connected to the first joint, and the other end of the first limiting member extends in a direction close to the first extension portion and is provided with an abutment portion, and the second limiting member is located on an outer wall of the second joint. When the first joint and the second joint are in a mounted state, the first limiting member is located on an outer side of the second limiting member, and the abutment portion abuts against a face of a side of the second limiting member facing away from the second extension portion.

In a possible embodiment, there is a plurality of the first limiting members, and the plurality of the first limiting members are spaced apart along a circumferential direction of the first extension portion; where two first limiting members are located at two opposite sides of the first extension portion in a direction perpendicular to the first direction.

It can be implemented that at least one first limiting member is provided with a rotation-stopping portion, and on the first limiting member provided with the rotation-stopping portion, the rotation-stopping portion is located on a side of the abutment portion facing towards the second extension portion; and the second limiting member is provided with a rotation-stopping through groove, a groove opening of the rotation-stopping through groove is located on a face of a side of the second limiting member facing away from the second joint and the rotation-stopping through groove extends in the first direction. When the first joint and the second joint are in a mounted state, the rotation-stopping portion is located in the rotation-stopping through groove.

In a possible embodiment, an accommodation member and an identification member are further included, where the accommodation member is connected to an end of the first extension portion facing towards the second extension portion, the accommodation member has a through hole which extends in the first direction, and the identification member is movably provided in the through hole along the first direction. The identification member includes a first elastic portion, a second elastic portion and an identification portion, where the first elastic portion and the second elastic portion are both located on a side of the identification portion facing towards the first extension portion, and are provided opposite to and spaced apart from each other in a second direction, and the first elastic portion includes a first outer wall facing away from the second elastic portion, and the second elastic portion includes a second outer wall facing away from the first elastic portion. When the identification member is in a non-identification state, the first elastic portion and the second elastic portion are at least partially located on a side of the accommodation member facing towards the first extension portion, and form an elastic protrusion portion, a distance between the first outer wall and the second outer wall of the elastic protrusion portion in the second direction is greater than a size of an opening of the through hole at an end of the through hole facing towards the first extension portion, and the identification portion is located in the through hole. When the first joint and the second joint are in a mounted state, the identification member is in an identification state, and the identification portion is located at a side of the accommodation member facing away from the first extension portion, and the elastic protrusion portion is located in the through hole and abuts against an inner wall of the through hole.

In a possible embodiment, in the elastic protrusion portion, the distance between the first outer wall and the second outer wall first increases gradually and then decreases gradually in a direction from the first extension portion to the second extension portion.

It can be implemented that the inner wall of the through hole includes a first inner wall and a second inner wall which are provided opposite to and spaced apart from each other in the second direction. An end of the first inner wall close to the first extension portion is provided with a first inclined plane, an end of the second inner wall close to the first extension portion is provided with a second inclined plane, and a distance between the first inclined plane and the second inclined plane gradually increases in a direction from the first extension portion to the second extension portion. A minimum distance between the first inclined plane and the second inclined plane is less than a maximum distance between the first outer wall and the second outer wall.

It can be implemented that the inner wall of the through hole includes a first inner wall and a second inner wall which are provided opposite to and spaced apart from each other in the second direction, and an end of the first inner wall away from the first extension portion is provided with a third inclined plane, and an end of the second inner wall away from the first extension portion is provided with a fourth inclined plane, and a distance between the third inclined plane and the fourth inclined plane gradually decreases in a direction from the first extension portion to the second extension portion. A minimum distance between the third inclined plane and the fourth inclined plane is less than a maximum distance between the first outer wall and the second outer wall.

In a possible embodiment, the limiting assembly includes a first limiting ring and a second limiting ring, the first extension portion is provided with two first flanges around an outer side of an end of the first extension portion facing towards the second extension portion, a clamping groove is formed between the two first flanges, and an inner wall of the first limiting ring is provided with a clamping tooth. When the first joint and the second joint are in a mounted state, the first limiting ring is sleeved outside the first joint and the second joint, and the second limiting ring is sleeved outside the first limiting ring and the clamping tooth is located in the clamping groove. A side of the first limiting ring facing towards the second extension portion is provided with a first notch, and an inner wall of the second limiting ring is provided with a first protrusion located in the first notch.

It can be implemented that a side of the second limiting ring facing away from the second extension portion is provided with a second notch and an outer wall of the first limiting ring is provided with a second protrusion located in the second notch.

In a possible embodiment, the second limiting ring includes an elastic member, a first operating member and a second operating member, where the elastic member is located on part of an outer periphery of the first limiting ring, and two ends of the elastic member along a circumferential direction of the second limiting ring are a first end and a second end respectively, and an opening is provided between the first end and the second end. The first operating member is connected to the first end and extends in a direction close to the second end, the second operating member is connected to the second end and extends towards a direction close to the first end, and the first operating member and the second operating member cross each other.

In a possible embodiment, when the side of the second limiting ring facing away from the second extension portion is provided with the second notch and the outer wall of the first limiting ring is provided with the second protrusion, the first operating member, the second operating member and the elastic member at the opening jointly enclose to form the second notch. A side of the second protrusion facing towards the second extension portion is provided with a first locking portion, and a side of the first operating member and the second operating member facing away from the second extension portion is provided with a second locking portion. One of the first locking portion and the second locking portion is a locking protrusion, in and the other one of the first locking portion and the second locking portion is a locking groove, and the locking protrusion is located in the locking groove when the first joint and the second joint are in a mounted state.

In a possible embodiment, an inner wall of the clamping tooth has a guide surface, and a distance between the guide surface of the clamping tooth and a center line of the first limiting ring gradually increases in a direction from the first extension portion to the second extension portion.

It can be implemented that an outer wall of the second joint located at the socket is provided with a second flange and an inner wall of the second limiting ring is provided with a third protrusion. When the first joint and the second joint are in a mounted state, the third protrusion is located on a side of the second flange facing away from the second extension portion.

A second aspect of the embodiments of the present application provides a vehicle, including the joint apparatus described in the first aspect.

The vehicle according to an embodiment of the present application includes a joint apparatus which may include a first joint, a second joint and a limiting assembly, where the first joint includes a first extension portion and a second extension portion provided in a first direction and an end of the second joint is provided with a socket. When the first joint and the second joint are in a mounted state, the first extension portion is inserted into the socket in the first direction, and the limiting assembly is configured to limit the first joint and the second joint from moving away from each other in the first direction. In this way, it is possible to prevent, by the limiting assembly, the first joint and the second joint from moving away from each other in the first direction so as to ensure a stable connection between the first joint and the second joint, thereby improving connection stability between the first joint and the second joint.

The constructions of the present application, as well as other inventive objects and beneficial effects thereof, will be more clearly and easily understood from the description of the embodiments taken in conjunction with the accompanying drawings.

BRIEF DESCRIPTION OF THE DRAWINGS

In order to illustrate the technical solutions in the embodiments of the present application or in the prior art more clearly, a brief description will be given to the accompanying drawings required in the description of the embodiments or prior art. Obviously, the accompanying drawings in the following description are some embodiments of the present application, and for those ordinary skilled in the art, other drawings can also be acquired from these drawings without creative effort.

LIST OF REFERENCE SIGNS

Figure 1:
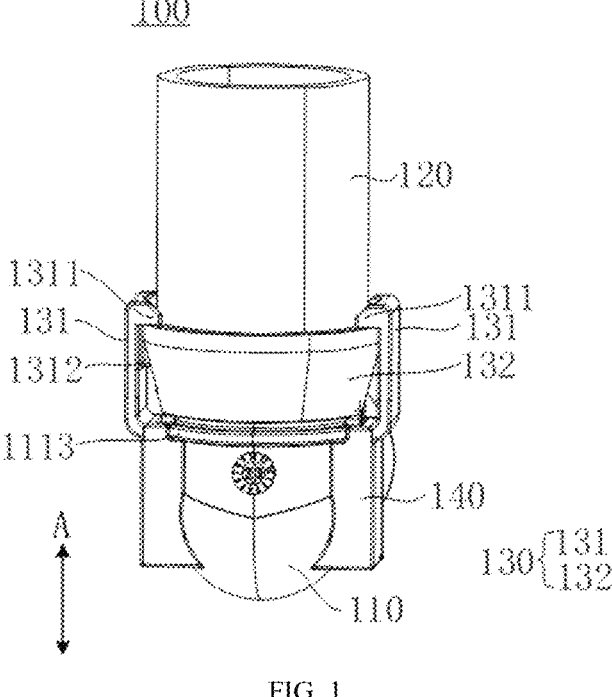
FIG. 1 is a structural schematic diagram of a joint apparatus according to an embodiment of the present application.

100: joint apparatus; 110: first joint;
111: first extension portion; 1111: first flange;
1112: clamping groove; 1113: support flange;
1114: sealing groove; 112: second extension portion;
120: second joint; 121: socket;
122: second flange; 130: limiting assembly;
131: first limiting member; 1311: abutment portion;
1312: rotation-stopping portion; 132: second limiting member;
1321: rotation-stopping through groove; 140: accommodation member;
141: through hole; 141*a*: first inner wall;
141*b*: second inner wall; 1411: first inclined plane;
1412: second inclined plane; 1413: third inclined plane;
1414: fourth inclined plane; 150: identification member;

150*a*: elastic protrusion portion; 151: first elastic portion;
1511: first outer wall; 152: second elastic portion;
1522: second outer wall; 153: identification portion;
160: first limiting ring; 160*a*: first limiting portion;
160*b*: second limiting portion; 160*c*: support portion;
161: first notch; 162: second protrusion;
1621: first locking portion; 163: third notch;
164: clamping tooth; 170: second limiting ring;
170*a*: first operating member; 170*b*: second operating member;
170*c*: elastic member; 171: first protrusion;
172: second notch; 1722: second locking portion;
173: third protrusion; 180: sealing ring.

DESCRIPTION OF EMBODIMENTS

In the relevant art, a joint apparatus may include a male joint and a female joint. One end of the female joint is pre-mounted to a cylinder body or a pump body in systems, and the other end of the female joint is provided with a socket, and one end of the male joint is inserted into the socket so as to connect the male joint with the female joint, and the other end of the male joint is connected to a pipeline, so that the pipeline is connected to the cylinder body or the pump body in systems through the joint apparatus.

However, the male joint and the female joint are only connected through insertion, and the joint apparatus is prone to accidental separation of the male joint from the female joint during an accidental collision, resulting in poor connection stability between the male joint and the female joint.

In view of at least one of the above-mentioned technical problems, embodiments of the present application provide a joint apparatus and a vehicle, where the joint apparatus may include a first joint, a second joint and a limiting assembly, where the first joint includes a first extension portion and a second extension portion that are provided in a first direction and an end of the second joint is provided with a socket. When the first joint and the second joint are in a mounted state, the first extension portion is inserted into the socket in the first direction. The limiting assembly is configured to limit the first joint and the second joint from moving away from each other in the first direction. In this way, it is possible to prevent by the limiting assembly the first joint and the second joint from moving away from each other in the first direction so as to ensure a stable connection between the first joint and the second joint, thereby improving connection stability between the first joint and the second joint.

In addition, due to that the first joint, the second joint and the limiting assembly have a simple structure, occupy a small space and have a lower processing difficulty, the joint apparatus according to the embodiment of the present application is more easily adaptable to a scenario in which an installation space is small during assembly of a whole vehicle. In addition, the reliability of the joint apparatus is further improved by the limiting assembly.

In order to make the purposes, technical solutions, and advantages of the embodiments of the present application more clear, the technical solutions in the embodiments of the present application will be described clearly and completely below with reference to the accompanying drawings. Obviously, the described embodiments are some of, but not all embodiments of the present application. Based on the embodiments of the present application, all other embodiments obtained by those ordinary skilled in the art without creative labor should fall within the protection scope of the present application.

The joint apparatus 100 provided in the embodiments of the present application will be described below with reference to FIGS. 1-17.

Referring to FIG. 1, an embodiment of the present application provides a joint apparatus 100 which may include a first joint 110, a second joint 120, and a limiting assembly 130. The joint apparatus 100 may be applied to vehicles or other devices. For example, at least one of the first joint 110 and the second joint 120 may be used to connect with pipelines (e.g., nylon pipelines, rubber hoses), joints, cylinder bodies, pumps, or the like. The embodiments of the present application take the joint apparatus 100 applied to a vehicle as an example for explanation.

In some embodiments, one of the first joint 110 and the second joint 120 may be used to connect with a cylinder body or pump body in the vehicle and serve as an input or output interface for fluid media such as fuel, coolant, etc. within the cylinder bodies or pump bodies, and the other one of the first joint 110 and the second joint 120 may be used to connect with a pipeline so that the pipeline in the vehicle can be communicated with a cylinder body or pump body in the vehicle through the first joint 110 and the second joint 120.

Figure 2:
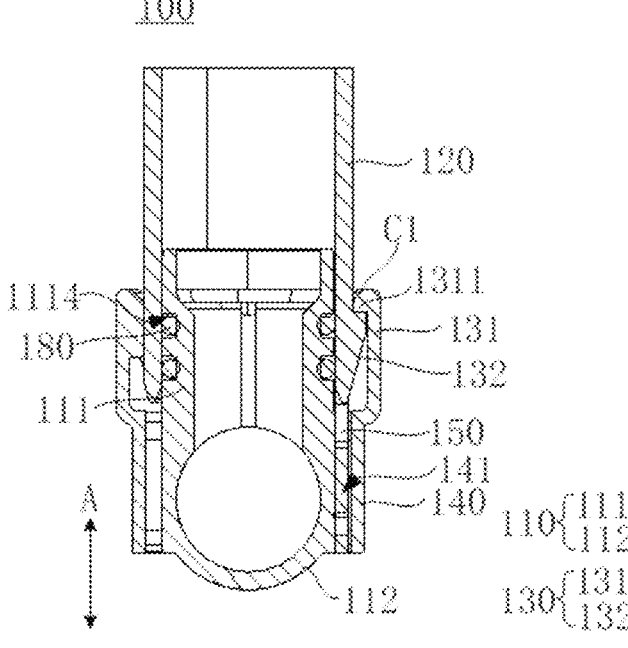
FIG. 2 is a sectional view of a joint apparatus according to an embodiment of the present application.
Figure 8:
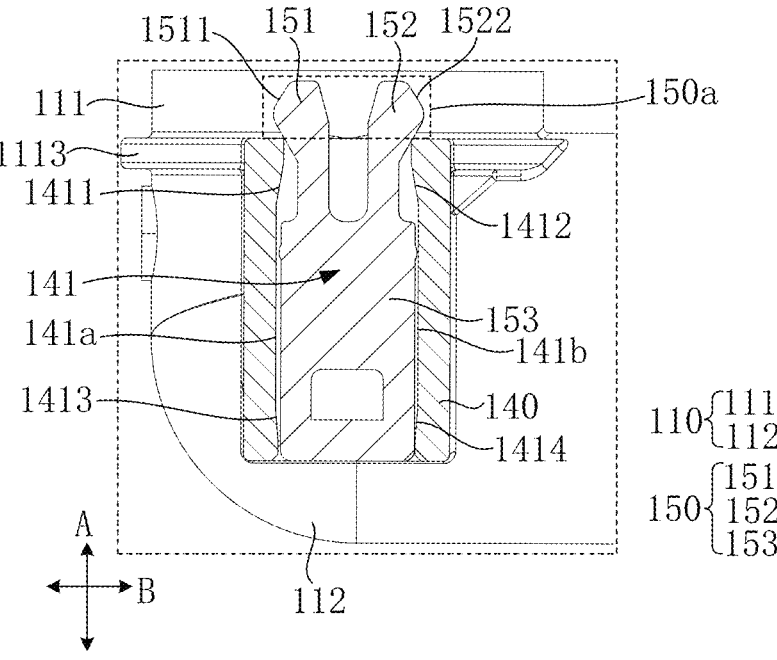
FIG. 8 is a partially enlarged schematic diagram of FIG. 7.

Referring to FIGS. 2 and 8, in some embodiments, the first joint 110 may include a first extension portion 111 and a second extension portion 112, which are provided in a first direction A. An end of the second joint 120 is provided with a socket 121. When the first joint 110 and the second joint 120 are in a mounted state, the first extension portion 111 is inserted into the socket 121 in the first direction A, so that the first joint 110 is inserted into and communicated with the second joint 120.

For example, an extension direction of the first extension portion 111 may be the same as that of the second extension portion 112 so that the first joint 110 has a relatively simple structure, which may reduce a manufacturing difficulty of the first joint 110. In an implementation, referring to FIG. 3, an extending direction of the first extension portion 111 may intersect with that of the second extension portion 112, and an included angle between the first extension portion 111 and the second extension portion 112 may be greater than or equal to 90° so as to reduce mutual interference between the second extension portion 112 and the second joint 120.

Figure 9:
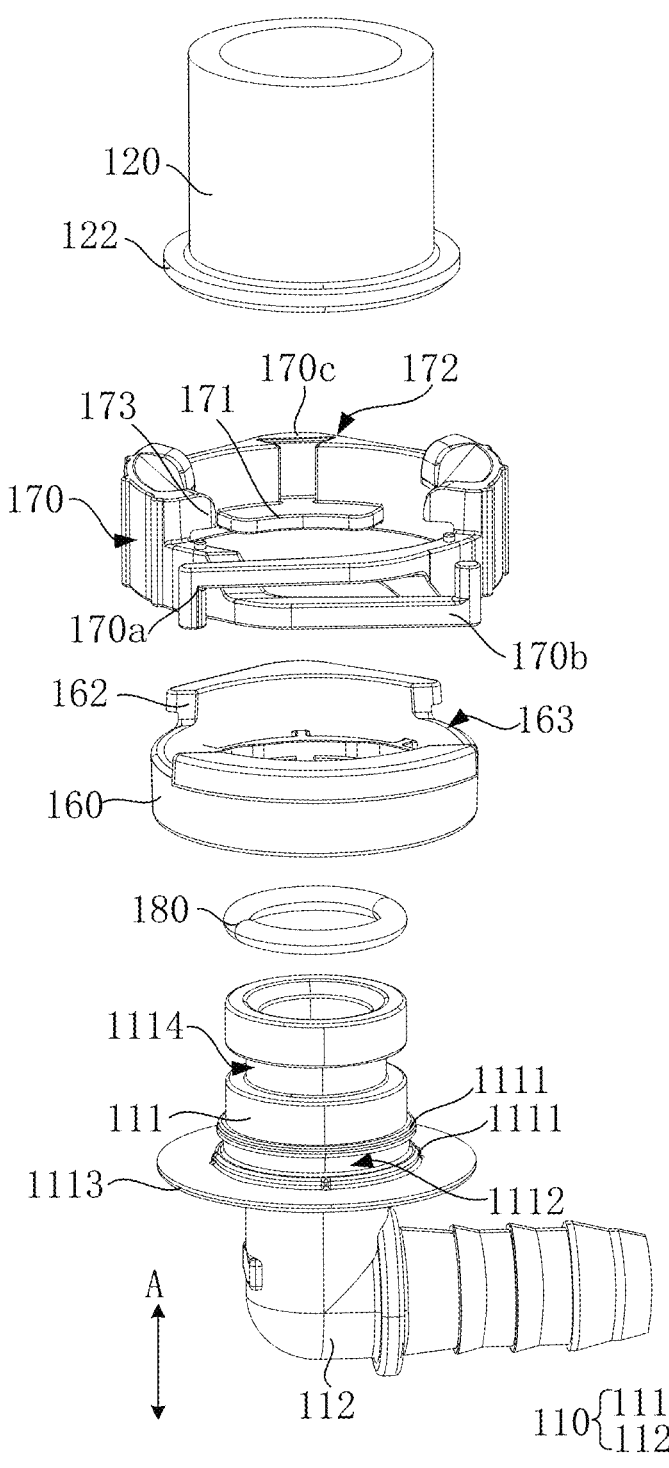
FIG. 9 is an exploded schematic diagram of a joint apparatus according to an embodiment of the present application.

In some embodiments, referring to FIGS. 1 and 9, the limiting assembly 130 may be configured to limit the first joint 110 and the second joint 120 from moving away from each other in the first direction A so as to avoid the first joint 110 and the second joint 120 from moving away from each other in the first direction A through the limiting assembly 130, thereby stabilizing the connection between the first joint 110 and the second joint 120 and improving the connection stability of the first joint 110 and the second joint 120.

A sealing ring 180 according to an embodiment of the present application will be described below.

Figure 5:
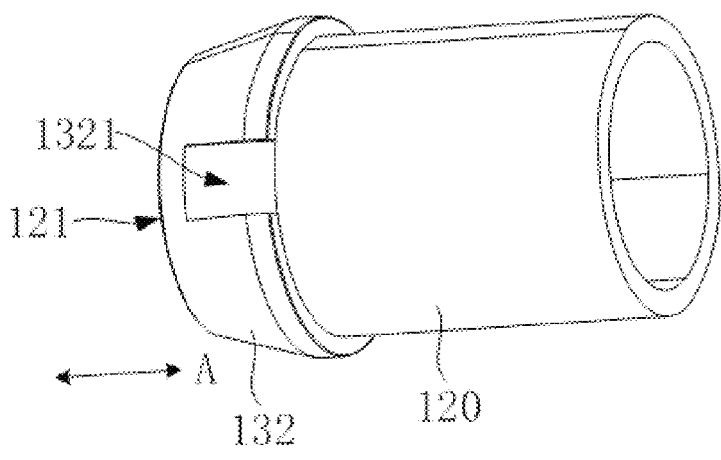
FIG. 5 is a structural schematic diagram of a second joint and a second limiting member according to an embodiment of the present application.

In some embodiments, referring to FIGS. 2 and 5, at least one sealing groove 1114 is provided around an outer side of the first extension portion 111, and one sealing ring 180 is located in one sealing groove 1114 correspondingly. When the first joint 110 and the second joint 120 are in a mounted state, two radial sides of the sealing ring 180 respectively abut against a bottom wall of the sealing groove 1114 and an inner wall of the second joint 120, so as to form a good sealing between the first joint 110 and the second joint 120.

For example, the number of the sealing ring 180 may be 1, 2, or 3, or any number of more than 3. When there is a plurality of sealing rings 180, the plurality of seal rings 180 are spaced apart in the first direction A, and the plurality of seal rings 180 can improve sealing reliability.

A support flange 113 according to an embodiment of the present application will be described below.

In some embodiments, as shown in FIG. 1, a support flange 1113 may be further provided around an outer side of the first joint 110, and a support flange 1113 may be located at an end of the first extension portion 111 facing towards the second extension portion 112. When the first joint 110 and the second joint 120 are in a mounted state, the support flange 1113 may be located on a side of the second joint 120 facing towards the second extension portion 112, and the support flange 1113 may be configured to limit the second joint 120 from continuing to move towards a direction close to the second extension portion 112.

An identifier according to an embodiment of the present application will be described below.

In some embodiments, the joint apparatus 100 is provided with an identifier, which may be a two-dimensional code identifier or other identifier. The identifier may comprehensively record information on the joint apparatus 100. For example, the information that can be recorded in the identifier includes, but is not limited to, production batch, source information, and the like, so that when the joint apparatus 100 is damaged, the source can be traced to analyze causes and provide guidance for production conditions. For example, the identifier may be a two-dimensional code identifier, and the information on the joint apparatus 100 may be obtained by scanning the code. For example, the identifier may be provided on the joint apparatus 100 by means of engraving.

In some embodiments, the identifier may be located on a surface of at least one of the first joint 110, the second joint 120, and the limiting assembly 130. For example, when the first joint 110 and the second joint 120 are in a mounted state, the identifier may be exposed outside the joint apparatus 100, so as to facilitate obtaining the information on the identifier without disassembling the first joint 110 and the second joint 120. For example, the identifier may be provided on the second extension portion 112, and the identifier may be located on a side of the support flange 1113 facing towards the second extension portion 112, so as to facilitate obtaining information on the identifier without disassembling the first joint 110 and the second joint 120.

Referring to FIGS. 1-8, a first embodiment of the limiting assembly 130 according to an embodiment of the present application will be described below.

Referring to FIGS. 1 and 2, the limiting assembly 130 may include a first limiting member 131 and a second limiting member 132, where the first limiting member 131 may extend in the first direction A and is located outside the first joint 110. One end of the first limiting member 131 is provided close to the second extension portion 112 and is connected to the first joint 110, and the other end of the first limiting member 131 extends in a direction close to the first extension portion 111 and can be provided with an abutment portion 1311. The abutment portion 1311 can be provided to protrude in a direction towards a center of the first extension portion 111. During an installation process of the first joint 110 and the second joint 120, the first joint 110 and the second joint 120 approach each other in the first direction A, and the second limiting member 132 applies an outward expansion force to the abutment portion 1311 and the first limiting member 131, so that the abutment portion 1311 and the first limiting member 131 are pressed outwards until the second limiting member 132 passes through the abutment portion 1311. When the first joint 110 and the second joint 120 are in a mounted state, the first limiting member 131 may be located an outer side of the second limiting member 132, and the abutment portion 1311 may abut against a face of a side of the second limiting member 132 facing away from the second extension portion 112, and then the abutment portion 1311 may limit the second limiting member 132 from moving away from the second extension portion 112 in the first direction A, so as to limit the first joint 110 and the second joint 120 from moving away from each other in the first direction A, thereby improving the connection stability between the first joint 110 and the second joint 120.

In some embodiments, referring to FIG. 2, a face of a side of the abutment portion 1311 facing towards the center of the first extension portion 111 may be provided with a guide surface C1. Along a direction from the first extension portion 111 to the second extension portion 112, a distance between the guide surface C1 of the abutment portion 1311 and the first extension portion 111 gradually decreases. The guide surface C1 of the abutment portion 1311 has a guiding effect on the movement of the second joint 120 towards a direction close to the first joint 110, so that it is easier for the second joint 120 to achieve an insertion connection with the first joint 110, thereby reducing the difficulty in insertion connection between the first joint 110 and the second joint 120.

In some embodiments, there may be a plurality of first limiting members 131, and the plurality of first limiting members 131 can be spaced apart along a circumference direction of the first extension portion 111, the plurality of first limiting members 131 have a relatively uniform limiting effect on the second limiting member 132, and the limiting effect on the second limiting member 132 is relatively good. For example, referring to FIG. 1, two first limiting members 131 may be located at two opposite sides of the first extension portion 111 in a direction perpendicular to the first direction A, so that the two first limiting members 131 may have good limiting effect on the second limiting member 132, thereby reducing the number of the first limiting member 131. For example, the number of the first limiting members 131 can be 2, 3 or any number of more than 3.

Figures 3, 4:
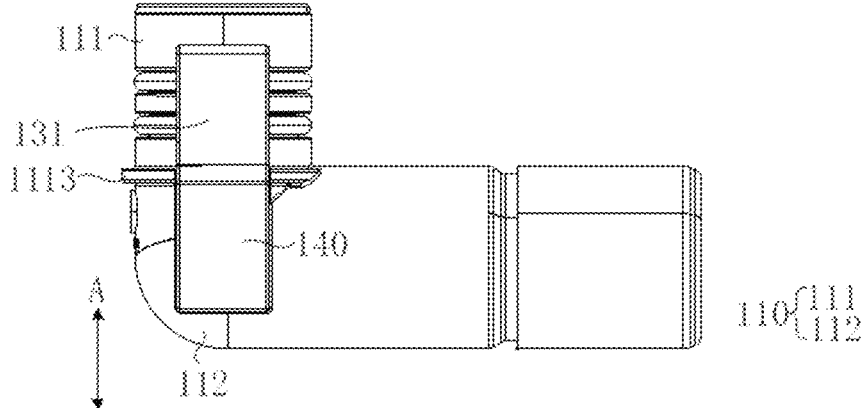
FIG. 3 is a structural schematic diagram of a first joint, a first limiting member and an accommodation member according to an embodiment of the present application.
FIG. 4 is another structural schematic diagram of a first joint, a first limiting member and an accommodation member according to an embodiment of the present application.

In some embodiments, referring to FIGS. 1, 4 and 5, at least one first limiting member 131 may be provided with a rotation-stopping portion 1312. On the first limiting member 131 provided with the rotation-stopping portion 1312, the rotation-stopping portion 1312 can be located on a side of the abutment portion 1311 facing towards the second extension portion 112, and the rotation-stopping portion 1312 is provided to protrude towards a center of the first extension portion 111. The second limiting member 132 may be provided with a rotation-stopping through groove 1321, a groove opening of the rotation-stopping through groove 1321 is located on a face of a side of the second limiting member 132 facing away from the second joint 120 and the rotation-stopping through groove 1321 may extend in the first direction A. When the first joint 110 and the second joint 120 are in a mounted state, the rotation-stopping portion 1312 may be located in the rotation-stopping through groove 1321, and a groove side wall of the rotation-stopping through groove 1321 may limit rotation of the rotation-stopping portion 1312 along the circumferential direction of the first extension portion 111, so as to limit mutual rotation between the first joint 110 and the second joint 120.

The following is an explanation of another setting manner for the identifier in the first embodiment of the limiting assembly 130.

Figure 6:
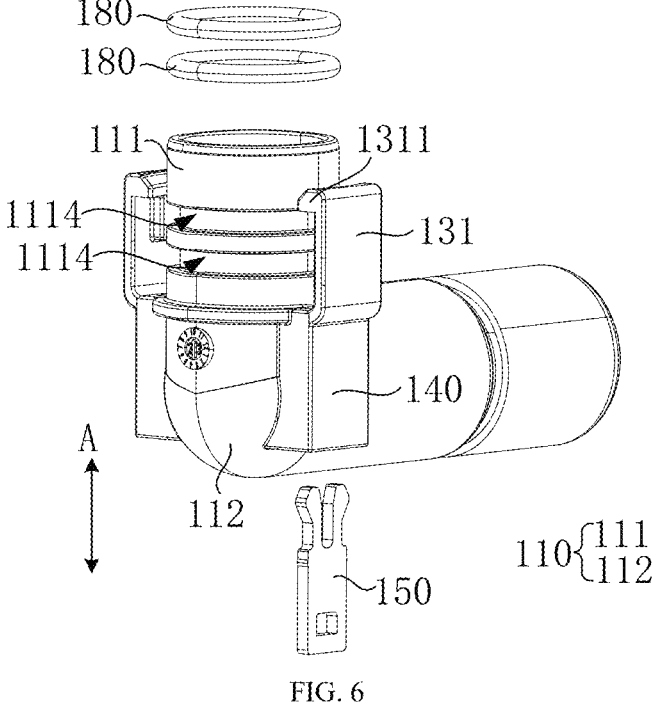
FIG. 6 is an exploded schematic diagram of a first joint, a first limiting member, an accommodation member, an identification member and a sealing ring according to the an embodiment of the present application.

In some embodiments, referring to FIGS. 2 and 6, the joint apparatus 100 may include an accommodation member 140 and an identification member 150. The accommodation member may be connected to an end of the first extension portion 111 facing towards the second extension portion 112. During the installation process of the first joint 110 and the second joint 120, the second joint 120 moves towards a direction close to the second extension portion 112, and contacts with the identification member 150 protruding from the accommodation member 140, and pushes the identification member 150 to move along a direction from the first extension portion 111 to the second extension portion 112, so that an identification portion 153 of the identification member 150 protrudes from the other end of the accommodation member 140.

There may be a plurality of accommodation members 140, and the plurality of accommodation members 140 may be spaced apart along a circumference direction of the first extension portion 111. For example, the identification member 150 may be provided within at least one accommodation member 140. For example, referring to FIG. 1, two accommodation members 140 may be respectively located on left side and right side of the first joint 110, and the accommodation member 140 on the left or right side may be provided with the identification member 150.

For example, the first limiting member 131 may be directly or indirectly connected to the first joint 110. The first limiting member 131 may be connected to the accommodation member 140 so as to be connected to the first joint 110 through the accommodation member 140.

In an embodiment in which the support flange 1113 is provided, sides of the accommodation member 140 and of the support flange 1113 facing towards the first extension portion 111 may be flush, and both the accommodation member 140 and the support flange 1113 may limit continued movement of the second joint 120 towards a direction close to the second extension portion 112.

Figure 7:
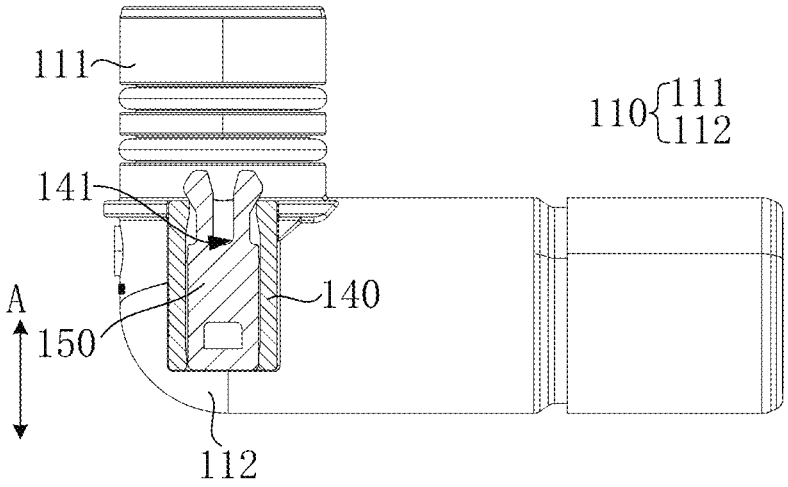
FIG. 7 is a partial sectional view of a first joint, an accommodation member and an identification member according to an embodiment of the present application.

In some embodiments, referring to FIGS. 2, 7 and 8, the accommodation member 140 may have a through hole 141 therein, the through hole 141 may extend in the first direction A, and the identification member 150 may be movably provided in the through hole 141 in the first direction A. The identification member 150 may include a first elastic portion 151, a second elastic portion 152, and an identification portion 153. The identifier may be provided on the identification portion 153. Both the first elastic portion 151 and the second elastic portion 152 may be located on a side of the identification portion 153 facing towards the first extension portion 111. The first elastic portion 151 and the second elastic portion 152 may be provided opposite to and spaced apart from each other in a second direction B. The first elastic portion 151 may include a first outer wall 1511 facing away from the second elastic portion 152, and the second elastic portion 152 may include a second outer wall 1522 facing away from the first elastic portion 151. The first elastic portion 151 and the second elastic portion 152 may generate a displacement deformation along a direction of approaching to or moving away from each other in the second direction B, so that a distance between the first outer wall 1511 and the second outer wall 1522 is decreased or increased.

In some embodiments, referring to FIG. 8, when the identification member 150 is in a non-identification state, the first joint 110 and the second joint 120 are not installed in place, the first elastic portion 151 and the second elastic portion 152 may be at least partially located on a side of the accommodation member 140 facing towards the first extension portion 111 to form an elastic protrusion portion 150a, and the elastic protrusion portion 150a is exposed outside the through hole 141. In the second direction B, a distance between the first outer wall 1511 and the second outer wall 1522 of the elastic protrusion portion 150*a* is greater than a size of an opening of the through hole 141 at an end of the through hole 141 facing towards the first extension portion 111, so that the elastic protrusion portion 150*a* can always be located outside the through hole 141 when there is no external force acting on the elastic protrusion portion 150*a*. At this time, the identification portion 153 may be located inside the through hole 141 so as to protect the identification portion 153. During the installation process of the first joint 110 and the second joint 120, the second joint 120 moves towards a direction close to the second extension portion 112 and drives the first elastic portion 151 and the second elastic portion 152 to approach to each other to generate a displacement deformation so as to decrease the distance between the first outer wall 1511 and the second outer wall 1522, so that the elastic protrusion portion 150*a* can be pushed into the through hole 141 and that the identification member 150 moves in a direction away from the first extension portion 111 until the second joint 120 abuts against the accommodation member 140 and/or the support flange 1113. At this time, the first joint 110 and the second joint 120 are installed in place and the identification portion 153 extends out of the through hole 141 from an end of the accommodation member 140 facing away from the first extension portion 111, so that the identification portion 153 is exposed outside the accommodation member 140 and that the identification member 150 is in an identification state. That is, when the identification member 150 is in the identification state, the identification portion 153 is located at a side of the accommodation member 140 facing away from the first extension portion 111, the elastic protrusion portion 150*a* may be located within the through hole 141, and the elastic protrusion portion 150*a* may abut against an inner wall of the through hole 141, so that the elastic protrusion portion 150*a* is not easy to separate from the inner wall of the through hole 141 under the action of this abutting force, thereby preventing the identification member 150 from dropping.

In some embodiments, referring to FIG. 8, in the elastic protrusion portion 150*a*, the distance between the first outer wall 1511 and the second outer wall 1522 gradually increases and then gradually decreases in a direction from the first extension portion 111 to the second extension portion 112, so that the first outer wall 1511 and the second outer wall 1522 of the elastic protrusion portion 150*a* have a guiding effect, and thus it is easier for the elastic protrusion portion 150*a* to enter into or extend out of the accommodation member 140 in the first direction A.

In some embodiments, referring to FIG. 8, the inner wall of the through hole 141 may include a first inner wall 141*a* and a second inner wall 141*b*, which are provided opposite to and spaced apart from each other in the second direction B. In the elastic protrusion portion 150*a*, a maximum value of the distance between the first outer wall 1511 and the second outer wall 1522 is referred to as a maximum distance. An end of the first inner wall 141*a* close to the first extension portion 111 may have a first inclined plane 1411, an end of the second inner wall 141*b* close to the first extension portion 111 may have a second inclined plane 1412, and a distance between the first inclined plane 1411 and the second inclined plane 1412 gradually increases in a direction from the first extension portion 111 to the second extension portion 112, and a minimum distance between the first inclined plane 1411 and the second inclined plane 1412 is less than the maximum distance between the first outer wall 1511 and the second outer wall 1522. In this way, after the elastic protrusion portion 150*a* is pushed into the through hole 141 by the second joint 120, the first inclined plane 1411 and the second inclined plane 1412 may continue to apply a force facing away from the first extension portion 111 to the elastic protrusion portion 150*a*, so that the identification member 150 can continue to move in the direction away from the first extension portion 111 so as to facilitate the ejection of the identification portion 153. Exemplarily, after being assembled in place, the second joint 120 squeezes the identification member 150, so that the identification portion 153 ejects out and is exposed outside the accommodation member 140, and then the code can be scanned, so that an error proofing function may be provided, and it is possible to confirm whether the second joint 120 is assembled in place by ejection of the identification member 150.

In some embodiments, referring to FIG. 8, an inner wall of the through hole 141 may include a first inner wall 141*a* and a second inner wall 141*b* that are provided opposite to and spaced apart from each other in the second direction B. In the elastic protruding portion 150*a*, a maximum value of the distance between the first outer wall 1511 and the second outer wall 1522 is referred to as a maximum distance. An end of the first inner wall 141*a* facing away from the first extension portion 111 has a third inclined plane 1413, an end of the second inner wall 141*b* facing away from the first extension portion 111 has a fourth inclined plane 1414, a distance between the third inclined plane 1413 and the fourth inclined plane 1414 gradually decreases in a direction from the first extension portion 111 to the second extension portion 112, and a minimum distance between the third inclined plane 1413 and the fourth inclined plane 1414 is less than the maximum distance between the first outer wall 1511 and the second outer wall 1522. In this way, when the identification member 150 is in an identification state, the third inclined plane 1413 and the fourth inclined plane 1414 can prevent the elastic protrusion portion 150*a* from moving towards a direction away from the first extension portion 111, so as to prevent the identification member 150 from falling out of the accommodation member 140.

In some embodiments, referring to FIG. 8, a dimension of the identification portion 153 in the second direction B may be greater than a minimum distance between the first inclined plane 1411 and the second inclined plane 1412, thereby preventing the identification portion 153 from falling out of the accommodation member 140 along a direction from the second extension portion 112 to the first extension portion 111 before the first joint 110 and the second joint 120 are assembled. The dimension of the identification portion 153 in the second direction B can be less than the distance between the third inclined plane 1413 and the fourth inclined plane 1414, so that the ejection of the identification portion 153 can be easily achieved.

In some embodiments, the first inner wall 141*a* includes a first plane located between the first inclined plane 1411 and the third inclined plane 1413, and the second inner wall 141*b* includes a second plane located between the second inclined plane 1412 and the fourth inclined plane 1414. A distance between the first plane and the second plane is equal everywhere, and structures of the first plane and second plane are relatively simple, which can reduce the difficulty in preparation of the through hole 141.

Referring to FIGS. 9 to 17, a second embodiment of the limiting assembly 130 provided in the present application will be described below, and the differences between the limiting assembly 130 in the second embodiment and the limiting assembly 130 in the first embodiment will be mainly described.

Figure 10:
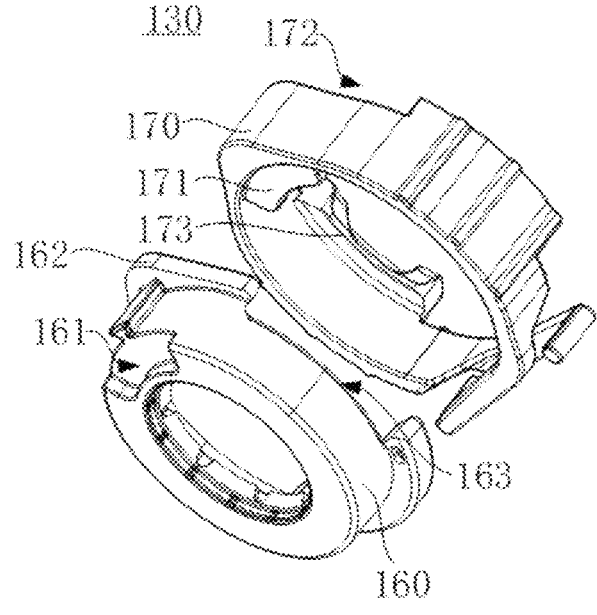
FIG. 10 is a structural schematic diagram of a limiting assembly according to embodiments of the present application.
Figure 11:
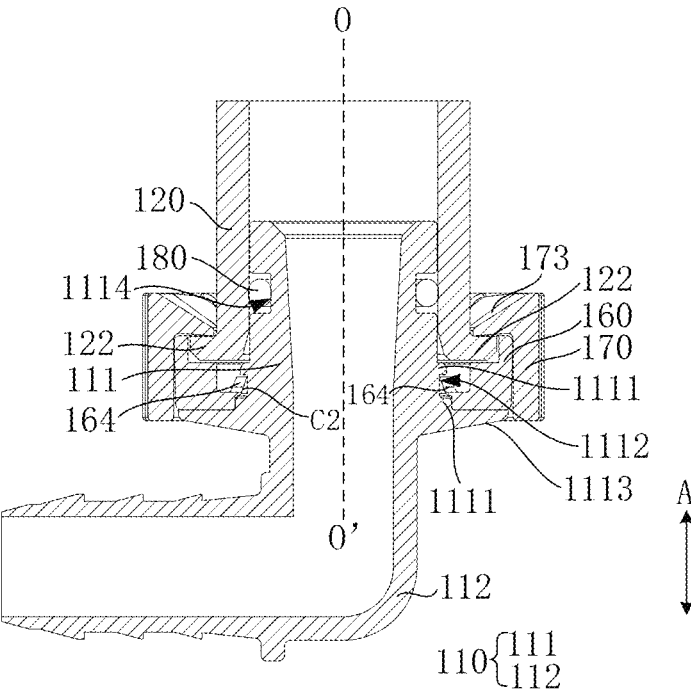
FIG. 11 is a sectional view of a joint apparatus according to an embodiment of the present application.
Figure 12:
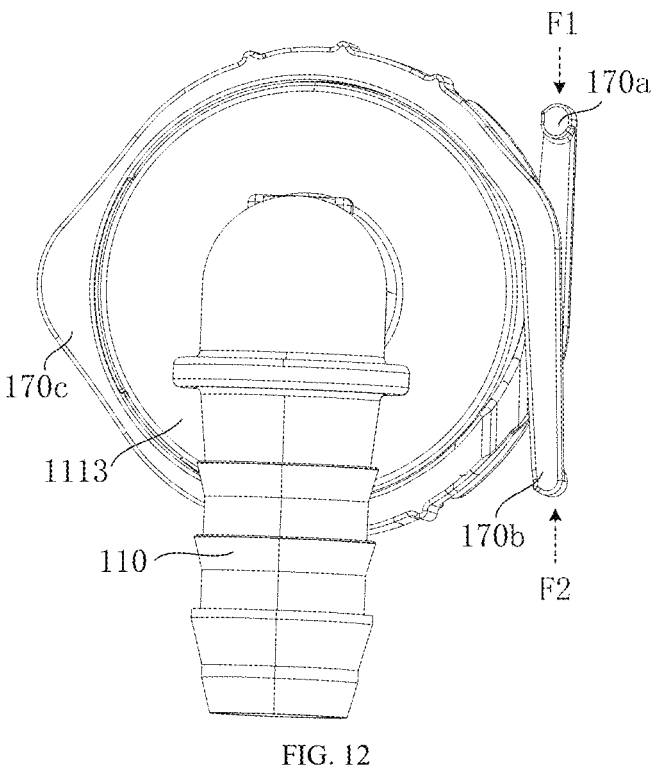
FIG. 12 is a structural schematic diagram of a limiting assembly and a first joint according to an embodiment of the present application.
Figure 13:
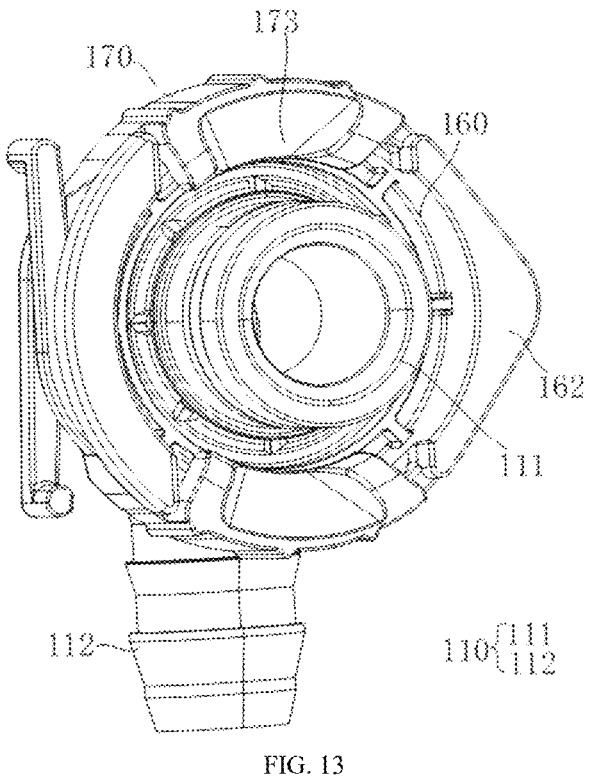
FIG. 13 is another structural schematic diagram of a limiting assembly and a first joint according to an embodiment of the present application.

In some embodiments, referring to FIGS. 9 to 11, the limiting assembly 130 may include a first limiting ring 160 and a second limiting ring 170, two first flanges 1111 may be provided around an outer side of an end of the first extension portion 111 facing towards the second extension portion 112 and a clamping groove 1112 may be formed between the two first flanges 1111. An inner wall of the first limiting ring 160 is provided with a clamping tooth 164. When the first joint 110 and the second joint 120 are in a mounted state, the first limiting ring 160 may be sleeved outside the first joint 110 and the second joint 120, the second limiting ring 170 may be sleeved outside the first limiting ring 160, and the clamping tooth 164 is located in the clamping groove 1112. By means of cooperation of the clamping tooth 164 and the clamping groove 1112, the movement between the first limiting ring 160 and the first joint 110 in the first direction A may be limited, so that the first limiting ring 160 is stably connected with the first joint 110. In an embodiment where the support flange 1113 is provided, the support flange 1113 may be located on a side of the first flange 1111 facing towards the second extension portion 112, and the support flange 1113 may abut against a face of a side of the first limiting ring 160 facing towards the second extension portion 112, so as to better limit the first limiting ring 160 from continuing to move in a direction towards the second extension portion 112, and to improve the connection stability between the first limiting ring 160 and the first joint 110. The first limiting ring 160 may be interference press-fit with the first joint 110. The first limiting ring 160 serves as a connection structure, and can connect the first joint 110 with the second limiting ring 170.

For example, referring to FIG. 11, an inner wall of the clamping tooth 164 (that is, a wall of a side of the clamping tooth 164 facing towards the center of the first extension portion 111) may be provided with a guide surface C2. Along the direction from the first extension portion 111 to the second extension portion 112, a distance between the guide surface C2 of the clamping tooth 164 and a center line OO' of the first limiting ring 160 gradually increases. The guide surface C2 of the clamping tooth 164 has a guiding function, and during a process in which the first limiting ring 160 is sleeved around the first joint 110, the first flange 1111 applies an outward expansion force to the clamping tooth 164 through the guide surface C2, so that the clamping tooth 164 is pressed outward until the clamping tooth 164 passes through one of the first flanges 1111, so that the clamping tooth 164 is easier to enter the clamping groove 1112, thereby reducing the connection difficulty between the first limiting ring 160 and the first joint 110.

In some embodiments, referring to FIGS. 9 and 10, a side of the first limiting ring 160 facing towards the second extension portion 112 may be provided with a first notch 161, and an inner wall of the second limiting ring 170 may be provided with a first protrusion 171. When the first joint 110 and the second joint 120 are in the mounted state, the first protrusion 171 may be located in the first notch 161, so as to limit the movement of the second limiting ring 170 along the direction from the second extension portion 112 to the first extension portion 111. With continued reference to FIG. 16, in an embodiment where the support flange 1113 is provided, the first protrusion 171 may be located on a side of the support flange 1113 facing towards the first extension portion 111, and the support flange 1113 may limit the movement of the second limiting ring 170 along the direction from the first extension portion 111 to the second extension portion 112. By means of the first limiting ring 160 at the support flange 1113 and at the first notch 161, the second limiting ring 170 can be limited from moving in the first direction A, so that the second limiting ring 170 can be stably connected to the first limiting ring 160.

In some embodiments, referring to FIGS. 9 and 10, a side of the second limiting ring 170 facing away from the second extension portion 112 may be provided with a second notch 172 and an outer wall of the first limiting ring 160 may be provided with a second protrusion 162. When the first joint 110 and the second joint 120 are in a mounted state, the second protrusion 162 is located in the second notch 172 so as to limit the second limiting ring 170 from moving in a direction from the second extension portion 112 to the first extension portion 111.

In some embodiments, referring to FIGS. 10 and 11, a side of the first limiting ring 160 facing away from the second extension portion 112 may be provided with a third notch 163, and an inner wall of the second limiting ring 170 may be provided with a third protrusion 173. When the first joint 110 and the second joint 120 are in a mounted state, the third protrusion 173 is located in the third notch 163, so as to limit the second limiter ring 170 from moving along a direction from the first extension portion 111 to the second extension portion 112. For example, the third notch 163 may be located between two adjacent second protrusions 162, and the second notch 172 may be located between two adjacent third protrusions 173.

In some embodiments, referring to FIGS. 10 and 11, an outer wall of the second joint 120 located at the socket 121 is provided with a second flange 122. When the first joint 110 and the second joint 120 are in a mounted state, the third protrusion 173 may be located on a side of the second flange 122 facing away from the second extension portion 112, and the third protrusion 173 may limit the second flange 122 from moving along a direction from the second extension portion 112 to the first extension portion 111, so as to limit the second joint 120 from moving along a direction from the second extension portion 112 to the first extension portion 111.

In some embodiments, the first limiting ring 160 may limit the second flange 122 (i.e., the second joint 120) from moving along a direction from the first extension portion 111 to the second extension portion 112, so that the second joint 120 can be limited from moving in the first direction A by cooperation of the first limiting ring 160 and the second limiting ring 170, so as to avoid the first joint 110 and the second joint 120 from moving away from each other in the first direction A, and thus the first joint 110 and the second joint 120 can be stably connected through the limiting assembly 130, improving the connection stability between the first joint 110 and the second joint 120.

Figure 17:
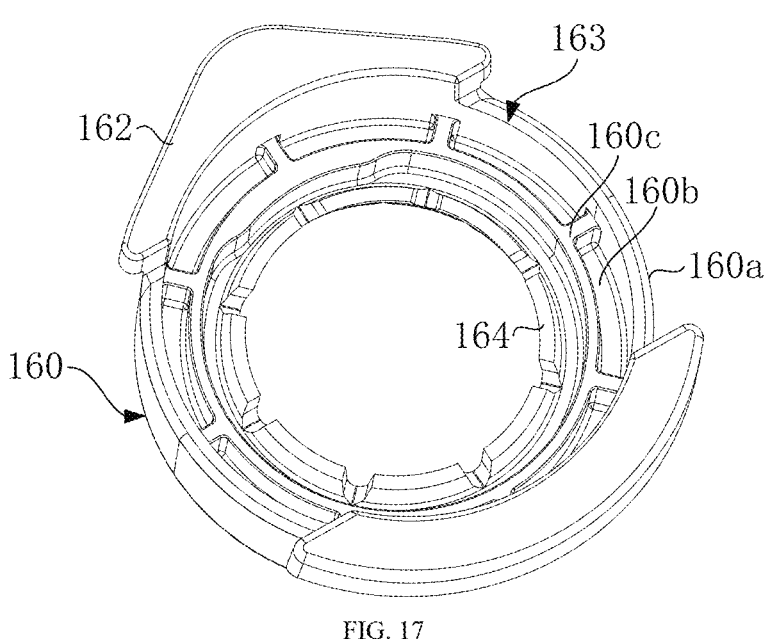
FIG. 17 is a structural schematic diagram of a first limiting ring according to an embodiment of the present application.

In some embodiments, referring to FIGS. 11 and 17, the first limiting ring 160 can include a first limiting portion 160a and a second limiting portion 160b, where the second limiting portion 160b can be located on an inner wall of the first limiting portion 160a, and the second limiting portion 160b can be located at an end of the first limiting portion 160a facing towards the second extension portion 112. The clamping tooth 164 may be provided on an inner wall of the second limiting portion 160b, a face of a side of the second limiting portion 160b facing away from the second extension portion 112 may be provided with a support portion 160c, and the support portion 160c may limit the second flange 122 from moving along a direction from the first extension portion 111 to the second extension portion 112, thereby limiting the second joint 120 from moving along a direction from the first extension portion 111 to the second extension portion 112. For example, the support portion 160*c* may include an annular first support portion and a plurality of second support portions located between the first support portion and the first limiting portion 160*a*, and the plurality of second support portions are spaced apart along a circumferential direction of the first limiting ring 160.

In some embodiments, an inner wall of the third protrusion 173 may be provided with a guide surface, and a distance between the guide surface of the third protrusion 173 and a center line of the second limiting ring 170 gradually decreases along the direction from the first extension portion 111 to the second extension portion 112. During a process in which the second joint 120 is inserted into the second limiting ring 170, the guide surface of the third protrusion 173 has a guiding effect on the second joint 120, and the second flange 122 may apply an outward expansion force to the third protrusion 173 through the guide surface, so that the third protrusion 173 is pressed outward until the second flange 122 passes through the third protrusion 173, which can reduce difficulty of inserting the second joint 120 into the second limiting ring 170.

In some embodiments, referring to FIGS. 9 and 12-14, the second limiting ring 170 may include an elastic member 170*c*, a first operating member 170*a* and a second operating member 170*b*, where the elastic member 170*c* may be located on part of an outer periphery of the first limiting ring 160. For example, the elastic member 170*c* may be curved in an arc shape. Exemplarily, at least part of the elastic member 170*c* may be made of an elastic material, a curvature of the elastic member 170*c* corresponds to that of the outer wall of the first limiting ring 160, and a center line of the elastic member 170*c* may be collinear with that of the first limiting ring 160, so that an inner wall of the elastic member 170*c* can better fit with the outer wall of the first limiting ring 160. For example, two ends of the elastic member 170*c* along a circumferential direction of the second limiting ring 170 are respectively a first end and a second end, and an opening is provided between the first end and the second end. The first operating member 170*a* is connected to the first end and extends in a direction close to the second end, and the second operating member 170*b* is connected to the second end and extends in a direction close to the first end, and the first operating member 170*a* and the second operating member 170*b* cross each other. The first operating member 170*a* and the second operating member 170*b* which cross each other form a scissor type press-to-unlock structure. When the second joint 120 needs to be disassembled, the first operating member 170*a* and the second operating member 170*b* may be used as force application points to apply an outward force to the two ends of the elastic member 170*c*, so as to enlarge the opening between the two ends of the elastic member 170*c*, that is, to cause the second limiting ring 170 to open and unlock to pull out the second joint 120 to achieve disassembly of the second joint 120, and in addition, to cause the second limiting ring 170 to separate from the first limiting ring 160 to achieve disassembly of the second limiting ring 170. Compared with enlarging the opening between the two ends of the elastic member 170*c* by holding the two ends of the elastic member 170*c* and applying a force, the opening between the two ends of the elastic member 170*c* can be enlarged more conveniently by pressing the first operating member 170*a* and the second operating member 170*b*, which makes the disassembly of the second limiting ring 170 and the second joint 120 become more convenient and labor-saving.

Figures 14, 15:
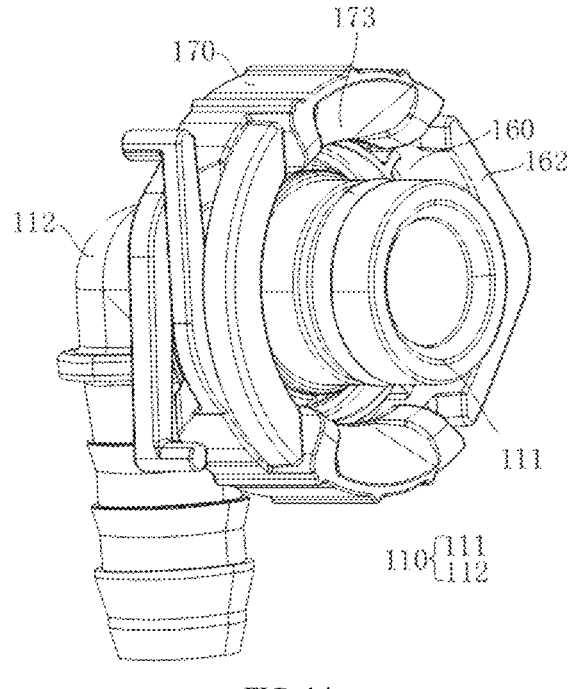
FIG. 14 is another structural schematic diagram of a limiting assembly and a first joint according to an embodiment of the present application.
FIG. 15 is a structural schematic diagram of a limiting assembly, a first locking portion and a second locking portion according to an embodiment of the present application.
Figure 16:
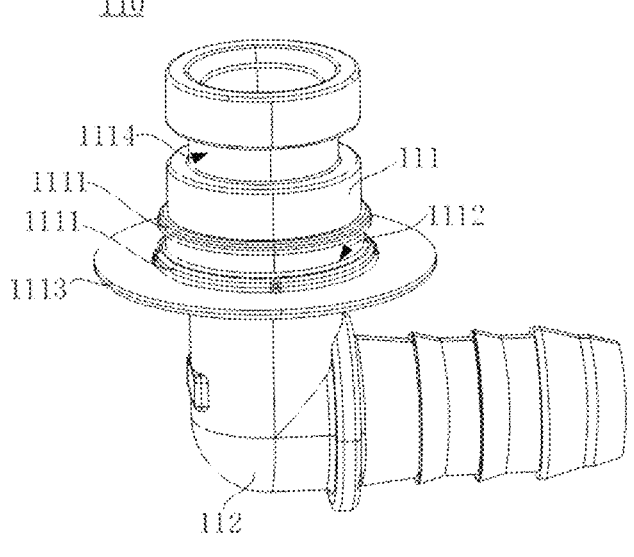
FIG. 16 is a structural schematic diagram of a first joint according to an embodiment of the present application.

Referring to FIG. 15, in the embodiment where a side of the second limiting ring 170 facing away from the second extension portion 112 is provided with the second notch 172 and an outer wall of the first limiting ring 160 is provided with the second protrusion 162, the first operating member 170*a*, the second operating member 170*b*, and the elastic member 170*c* at the opening may jointly enclose to form the second notch 172. A side of the second protrusion 162 facing towards the second extension portion 112 is provided with a first locking portion 1621, and a side of at least one of the first operating member 170*a* and the second operating member 170*b* facing away from the second extension portion 112 is provided with a second locking portion 1722. One of the first locking portion 1621 and the second locking portion 1722 is a locking protrusion, and the other one of the first locking portion 1621 and the second locking portion 1722 is a locking groove. When the first joint 110 and the second joint 120 are in a mounted state, the locking protrusion is located in the locking groove, so as to avoid unlocking of the second limiting ring 170 due to accidental touch, and to avoid separation of the second joint 120 from the first joint 110 due to accidental touch. When it is needed to disassemble the second joint 120 and the second limiting ring 170, a force facing away from the second protrusion 162 is firstly applied to the first operating member 170*a* and the second operating member 170*b* so as to cause the locking protrusion to exit from the locking groove, and then the opening between two ends of the elastic member 170*c* is enlarged by the first operating member 170*a* and the second operating member 170*b* to disassemble the second joint 120 and the second limiting ring 170.

In some embodiments, the first limiting ring 160 and the second limiting ring 170 (i.e., the limiting assembly 130) can rotate relative to the first joint 110 and the second joint 120. Even if the limiting assembly 130 is located within a narrow space of a vehicle, when disassembling the second limiting ring 170, the second limiting ring 170 can be disassembled easily by rotating the second limiting ring 170 in a direction that is convenient for observation and is easy for a finger to operate, which can achieve a 360° C. disassembly between the first limit ring 160 and the second limit ring 170.

Due to that the first joint 110, the second joint 120 and the limiting assembly 130 have a simple structure, occupy a small space and have a lower processing difficulty, the joint apparatus 100 according to the embodiments of the present application is more easily adaptable to a scenario in which an installation space is small during assembly of a whole vehicle. In addition, the reliability of the joint apparatus 100 is further improved by the limiting assembly 130.

An embodiment of the present application provides a vehicle, which may include the joint apparatus 100. The pipelines in systems such as a fuel system and a cooling system of the vehicle may be connected to a cylinder body or a pump body in the systems through the joint apparatus 100. When it is necessary to disconnect the pipelines in the vehicle from the cylinder body or the pump body in the vehicle, the first joint 110 and second joint 120 of the joint apparatus 100 can be separated from each other to disconnect the pipelines inside the vehicle from the cylinder body or the pump body inside the vehicle.

It should be noted that the numerical values and numerical ranges involved in the embodiments of the present application are approximate values, and may have a certain range of error due to influence of the manufacturing process, and the error can be considered negligible by those skilled in the art.

Finally, it should be noted that the foregoing embodiments are merely used to illustrate the technical solutions of the present application rather than to limit the present application. Although the present application has been described in detail with reference to the foregoing embodiments, those skilled in the art should understand that they may still make modifications to the technical solutions described in the foregoing embodiments, or make equivalent replacements to some or all technical features therein. These modifications or replacements do not make the essence of the corresponding technical solutions deviate from the scope of the technical solutions in the embodiments of the present application.

What is claimed is:

1. A joint apparatus, comprising: a first joint, a second joint and a limiting assembly, wherein the first joint comprises a first extension portion and a second extension portion that are provided in a first direction and an end of the second joint is provided with a socket; and when the first joint and the second joint are in a mounted state, the first extension portion is inserted into the socket in the first direction, and the limiting assembly is configured to limit the first joint and the second joint from moving away from each other in the first direction;

wherein the joint apparatus further comprises an accommodation member and an identification member, wherein the accommodation member is connected to an end of the first extension portion facing towards the second extension portion, the accommodation member has a through hole which extends in the first direction, and the identification member is movably provided in the through hole along the first direction;

the identification member comprises a first elastic portion, a second elastic portion and an identification portion, wherein the first elastic portion and the second elastic portion are both located on a side of the identification portion facing towards the first extension portion, and are provided opposite to and spaced apart from each other in a second direction, the first elastic portion comprises a first outer wall facing away from the second elastic portion, and the second elastic portion comprises a second outer wall facing away from the first elastic portion;

when the identification member is in a non-identification state, the first elastic portion and the second elastic portion are at least partially located on a side of the accommodation member facing towards the first extension portion, and form an elastic protrusion portion, a distance between the first outer wall and the second outer wall of the elastic protrusion portion in the second direction is greater than a size of an opening of the through hole at an end of the through hole facing towards the first extension portion, and the identification portion is located in the through hole; and when the first joint and the second joint are in the mounted state, the identification member is in an identification state, and the identification portion is located on a side of the accommodation member facing away from the first extension portion, and the elastic protrusion portion is located in the through hole and abuts against an inner wall of the through hole.

2. The joint apparatus according to claim 1, wherein the limiting assembly comprises a first limiting member and a second limiting member, the first limiting member is located on an outer wall of the first joint and extends in the first direction, one end of the first limiting member is provided adjacent to the second extension portion and is connected to the first joint, the other end of the first limiting member extends in a direction towards the first extension portion and is provided with an abutment portion, and the second limiting member is located on an outer wall of the second joint; and when the first joint and the second joint are in the mounted state, the first limiting member is located on an outer side of the second limiting member, and the abutment portion abuts against a face of a side of the second limiting member facing away from the second extension portion.

3. The joint apparatus according to claim 2, wherein there is a plurality of the first limiting members and the plurality of the first limiting members are spaced apart along a circumferential direction of the first extension portion;

wherein two first limiting members are located at two opposite sides of the first extension portion in a direction perpendicular to the first direction; and/or at least one first limiting member is provided with a rotation-stopping portion, and on the first limiting member provided with the rotation-stopping portion, the rotation-stopping portion is located on a side of the abutment portion facing towards the second extension portion, the second limiting member is provided with a rotation-stopping through groove, a groove opening of the rotation-stopping through groove is located on a face of a side of the second limiting member facing away from the second joint, and the rotation-stopping through groove extends in the first direction; and when the first joint and the second joint are in the mounted state, the rotation-stopping portion is located in the rotation-stopping through groove.

4. The joint apparatus according to claim 3, further comprising an accommodation member and an identification member, wherein the accommodation member is connected to an end of the first extension portion facing towards the second extension portion, the accommodation member has a through hole which extends in the first direction, and the identification member is movably provided in the through hole along the first direction;

the identification member comprises a first elastic portion, a second elastic portion and an identification portion, wherein the first elastic portion and the second elastic portion are both located on a side of the identification portion facing towards the first extension portion, and are provided opposite to and spaced apart from each other in a second direction, the first elastic portion comprises a first outer wall facing away from the second elastic portion, and the second elastic portion comprises a second outer wall facing away from the first elastic portion;

when the identification member is in a non-identification state, the first elastic portion and the second elastic portion are at least partially located on a side of the accommodation member facing towards the first extension portion, and form an elastic protrusion portion, a distance between the first outer wall and the second outer wall of the elastic protrusion portion in the second direction is greater than a size of an opening of the through hole at an end of the through hole facing towards the first extension portion, and the identification portion is located in the through hole; and when the first joint and the second joint are in the mounted state, the identification member is in an identification state, and the identification portion is located on a side of the accommodation member facing away from the first extension portion, and the elastic protrusion portion is located in the through hole and abuts against an inner wall of the through hole.

5. The joint apparatus according to claim 4, wherein in the elastic protrusion portion, a distance between the first outer wall and the second outer wall first increases gradually and then decreases gradually in a direction from the first extension portion to the second extension portion; and/or the inner wall of the through hole comprises a first inner wall and a second inner wall that are provided opposite to and spaced apart from each other in the second direction, an end of the first inner wall adjacent to the first extension portion is provided with a first inclined plane, an end of the second inner wall adjacent to the first extension portion is provided with a second inclined plane, and a distance between the first inclined plane and the second inclined plane gradually increases in the direction from the first extension portion to the second extension portion; and a minimum distance between the first inclined plane and the second inclined plane is less than a maximum distance between the first outer wall and the second outer wall; and/or the inner wall of the through hole comprises a first inner wall and a second inner wall that are provided opposite to and spaced apart from each other in the second direction, an end of the first inner wall away from the first extension portion is provided with a third inclined plane, and an end of the second inner wall away from the first extension portion is provided with a fourth inclined plane, and a distance between the third inclined plane and the fourth inclined plane gradually decreases in the direction from the first extension portion to the second extension portion; and a minimum distance between the third inclined plane and the fourth inclined plane is less than a maximum distance between the first outer wall and the second outer wall.

6. The joint apparatus according to claim 1, wherein in the elastic protrusion portion, a distance between the first outer wall and the second outer wall first increases gradually and then decreases gradually in a direction from the first extension portion to the second extension portion; and/or the inner wall of the through hole comprises a first inner wall and a second inner wall that are provided opposite to and spaced apart from each other in the second direction, an end of the first inner wall adjacent to the first extension portion is provided with a first inclined plane, an end of the second inner wall adjacent to the first extension portion is provided with a second inclined plane, and a distance between the first inclined plane and the second inclined plane gradually increases in the direction from the first extension portion to the second extension portion; and a minimum distance between the first inclined plane and the second inclined plane is less than a maximum distance between the first outer wall and the second outer wall; and/or the inner wall of the through hole comprises a first inner wall and a second inner wall that are provided opposite to and spaced apart from each other in the second direction, an end of the first inner wall away from the first extension portion is provided with a third inclined plane, and an end of the second inner wall away from the first extension portion is provided with a fourth inclined plane, and a distance between the third inclined plane and the fourth inclined plane gradually decreases in the direction from the first extension portion to the second extension portion; and a minimum distance between the third inclined plane and the fourth inclined plane is less than a maximum distance between the first outer wall and the second outer wall.

7. The joint apparatus according to claim 1, wherein the limiting assembly comprises a first limiting ring and a second limiting ring, two first flanges are provided around an outer side of an end of the first extension portion facing towards the second extension portion, a clamping groove is formed between the two first flanges, and an inner wall of the first limiting ring is provided with a clamping tooth, and when the first joint and the second joint are in the mounted state, the first limiting ring is sleeved outside the first joint and the second joint, the second limiting ring is sleeved outside the first limiting ring and the clamping tooth is located in the clamping groove;

a side of the first limiting ring facing towards the second extension portion is provided with a first notch, and an inner wall of the second limiting ring is provided with a first protrusion located in the first notch; and/or a side of the second limiting ring facing away from the second extension portion is provided with a second notch, and an outer wall of the first limiting ring is provided with a second protrusion located in the second notch.

8. The joint apparatus according to claim 7, wherein an inner wall of the clamping tooth has a guide surface, and a distance between the guide surface of the clamping tooth and a center line of the first limiting ring gradually increases in a direction from the first extension portion to the second extension portion; and/or an outer wall of the second joint located at the socket is provided with a second flange, an inner wall of the second limiting ring is provided with a third protrusion, and when the first joint and the second joint are in the mounted state, the third protrusion is located on a side of the second flange facing away from the second extension portion.

9. The joint apparatus according to claim 1, wherein the second limiting ring comprises an elastic member, a first operating member and a second operating member, wherein the elastic member is located on part of an outer periphery of the first limiting ring, and two ends of the elastic member along a circumferential direction of the second limiting ring are a first end and a second end respectively, and an opening is provided between the first end and the second end, the first operating member is connected to the first end and extends towards a direction close to the second end, the second operating member is connected to the second end and extends towards a direction close to the first end, and the first operating member and the second operating member cross each other.

10. The joint apparatus according to claim 9, wherein when the side of the second limiting ring facing away from the second extension portion is provided with the second notch and the outer wall of the first limiting ring is provided with the second protrusion, the first operating member, the second operating member and the elastic member at the opening jointly enclose to form the second notch, a side of the second protrusion facing towards the second extension portion is provided with a first locking portion, and a side of the first operating member and the second operating member facing away from the second extension portion is provided with a second locking portion; and one of the first locking portion and the second locking portion is a locking protrusion, and the other one of the first locking portion and the second locking portion is a locking groove, and the locking protrusion is located in the locking groove when the first joint and the second joint are in the mounted state.

11. A vehicle, comprising the joint apparatus according to claim 1.

12. The vehicle according to claim 11, wherein the limiting assembly comprises a first limiting member and a second limiting member, the first limiting member is located on an outer wall of the first joint and extends in the first direction, one end of the first limiting member is provided adjacent to the second extension portion and is connected to the first joint, the other end of the first limiting member extends in a direction towards the first extension portion and is provided with an abutment portion, and the second limiting member is located on an outer wall of the second joint; and when the first joint and the second joint are in the mounted state, the first limiting member is located on an outer side of the second limiting member, and the abutment portion abuts against a face of a side of the second limiting member facing away from the second extension portion.

13. The vehicle according to claim 12, wherein there is a plurality of the first limiting members and the plurality of the first limiting members are spaced apart along a circumferential direction of the first extension portion;

wherein two first limiting members are located at two opposite sides of the first extension portion in a direction perpendicular to the first direction; and/or at least one first limiting member is provided with a rotation-stopping portion, and on the first limiting member provided with the rotation-stopping portion, the rotation-stopping portion is located on a side of the abutment portion facing towards the second extension portion, the second limiting member is provided with a rotation-stopping through groove, a groove opening of the rotation-stopping through groove is located on a face of a side of the second limiting member facing away from the second joint, and the rotation-stopping through groove extends in the first direction; and when the first joint and the second joint are in the mounted state, the rotation-stopping portion is located in the rotation-stopping through groove.

14. The vehicle according to claim 13, wherein in the elastic protrusion portion, a distance between the first outer wall and the second outer wall first increases gradually and then decreases gradually in a direction from the first extension portion to the second extension portion; and/or the inner wall of the through hole comprises a first inner wall and a second inner wall that are provided opposite to and spaced apart from each other in the second direction, an end of the first inner wall adjacent to the first extension portion is provided with a first inclined plane, an end of the second inner wall adjacent to the first extension portion is provided with a second inclined plane, and a distance between the first inclined plane and the second inclined plane gradually increases in the direction from the first extension portion to the second extension portion; and a minimum distance between the first inclined plane and the second inclined plane is less than a maximum distance between the first outer wall and the second outer wall; and/or the inner wall of the through hole comprises a first inner wall and a second inner wall that are provided opposite to and spaced apart from each other in the second direction, an end of the first inner wall away from the first extension portion is provided with a third inclined plane, and an end of the second inner wall away from the first extension portion is provided with a fourth inclined plane, and a distance between the third inclined plane and the fourth inclined plane gradually decreases in the direction from the first extension portion to the second extension portion; and a minimum distance between the third inclined plane and the fourth inclined plane is less than a maximum distance between the first outer wall and the second outer wall.

15. The vehicle according to claim 11, wherein the limiting assembly comprises a first limiting ring and a second limiting ring, two first flanges are provided around an outer side of an end of the first extension portion facing towards the second extension portion, a clamping groove is formed between the two first flanges, and an inner wall of the first limiting ring is provided with a clamping tooth, and when the first joint and the second joint are in the mounted state, the first limiting ring is sleeved outside the first joint and the second joint, the second limiting ring is sleeved outside the first limiting ring and the clamping tooth is located in the clamping groove;

a side of the first limiting ring facing towards the second extension portion is provided with a first notch, and an inner wall of the second limiting ring is provided with a first protrusion located in the first notch; and/or a side of the second limiting ring facing away from the second extension portion is provided with a second notch, and an outer wall of the first limiting ring is provided with a second protrusion located in the second notch.

16. The vehicle according to claim 15, wherein an inner wall of the clamping tooth has a guide surface, and a distance between the guide surface of the clamping tooth and a center line of the first limiting ring gradually increases in a direction from the first extension portion to the second extension portion; and/or an outer wall of the second joint located at the socket is provided with a second flange, an inner wall of the second limiting ring is provided with a third protrusion, and when the first joint and the second joint are in the mounted state, the third protrusion is located on a side of the second flange facing away from the second extension portion.

17. The vehicle according to claim 11, wherein the second limiting ring comprises an elastic member, a first operating member and a second operating member, wherein the elastic member is located on part of an outer periphery of the first limiting ring, and two ends of the elastic member along a circumferential direction of the second limiting ring are a first end and a second end respectively, and an opening is provided between the first end and the second end, the first operating member is connected to the first end and extends towards a direction close to the second end, the second operating member is connected to the second end and extends towards a direction close to the first end, and the first operating member and the second operating member cross each other.

18. The vehicle according to claim 17, wherein when the side of the second limiting ring facing away from the second extension portion is provided with the second notch and the outer wall of the first limiting ring is provided with the second protrusion, the first operating member, the second operating member and the elastic member at the opening jointly enclose to form the second notch, a side of the second protrusion facing towards the second extension portion is provided with a first locking portion, and a side of the first operating member and the second operating member facing away from the second extension portion is provided with a second locking portion; and one of the first locking portion and the second locking portion is a locking protrusion, and the other one of the first locking portion and the second locking portion is a locking groove, and the locking protrusion is located in the locking groove when the first joint and the second joint are in the mounted state.

\* \* \* \* \*